United States Patent Office 3,829,456
Patented Aug. 13, 1974

3,829,456
METHOD FOR MAKING t-BUTYL 2,4,5-TRI-
CHLORO PHENYL CARBONATE
Harold Berman, Norwich, N.Y., assignor to Morton-
Norwich Products, Inc.
No Drawing. Filed Apr. 28, 1972, Ser. No. 248,626
Int. Cl. C07c 69/00
U.S. Cl. 260—463                        1 Claim

ABSTRACT OF THE DISCLOSURE

A process for preparing t-butyl 2,4,5-trichlorophenyl carbonate, useful in the synthesis of peptides.

This invention is concerned with a process for preparing t-butyl 2,4,5-trichlorophenyl carbonate, a compound useful for introducing a protective group upon the amino function of amino acids to provide an easily removable group in the synthesis of peptides where the individual amino acids are sequentially introduced.

In the synthesis of peptides comprising the stepwise conjugation of amino acids it is necessary to protect the amine function during the course of the reactions wherein each subsequent step introduces another amino acid. It is also necessary that such amine function protective group be easily removable without disruption to the building of the peptide molecule.

Many such protective groups have been employed in the synthesis of peptides. One of the most popular is the t-butoxy-carbonyl group, familiarly referred to as the t-BOC reagent, since it exerts the requisite protective function upon the amino group of amino acids and can be displaced therefrom under very mild conditions.

It has been discovered that t-butyl 2,4,5-trichlorophenyl carbonate, a useful t-BOC reagent, can be readily prepared by reacting bis 2,4,5-trichlorophenyl carbonate with t-butanol in the presence of sodium t-butoxide.

In order that this invention may be readily available to and understood by those skilled in the art, the following example is supplied:

Sodium meta, 3.06 g. (0.133 g. atoms) was dissolved in 250 g. (3.38 moles) of refluxing t-butanol. After solution had been completed, 56.0 g. of bis 2,4,5-trichlorophenyl carbonate (0.133 moles) was added and reflux continued (82–84° C.) for 40 minutes. The reaction mixture was cooled to 25° C., and the excess t-butanol was stripped in vacuo (10–20 mm. Hg) at a water bath temperature of 65° C. (internal temperature 34° C.).

The residue was dissolved in 125 ml. of dichloromethane, and the resulting solution extracted twice with 135 ml. of 1N sodium hydroxide. The organic phase was washed with water until neutral. After drying the organic phase over anhydrous sodium sulfate, the solvent was removed in vacuo leaving an amber syrup which quickly crystallized to a white solid. The weight of the product was 29.03 g. or a yield of 73.5% based on bis 2,4,5-trichlorophenyl carbonate. The product was identified by its I.R. The melting point was 62–67° C. with slight softening at 58° C.

What is claimed is:
1. The process for preparing t-butyl 2,4,5-trichlorophenyl carbonate which consists in reacting bis 2,4,5-trichlorophenyl carbonate with t-butanol in the presence of an equimolar amount of sodium t-butoxide in a non-closed system and at a temperature of from 82–84° C. for a period of about 40 minutes.

References Cited
UNITED STATES PATENTS
3,549,682  12/1970  Vernaleken et al. ____ 260—463
FOREIGN PATENTS
1,166,404  10/1969  Great Britain.

LEWIS GOTTS, Primary Examiner
D. G. RIVERS, Assistant Examiner